United States Patent
Wu et al.

(10) Patent No.: US 7,202,914 B2
(45) Date of Patent: Apr. 10, 2007

(54) DIGITAL TELEVISION TRANSMITTER IDENTIFICATION SYSTEM USING PSEUDO-RANDOM SEQUENCES

(75) Inventors: Yiyan Wu, Kanata (CA); Xianbin Wang, Kanata (CA); Sebastien Lafleche, Quebec (CA); Benoit Ledoux, Quebec (CA); Bernard Caron, Ottawa (CA)

(73) Assignee: Her Majest the Queen in Right of Canada as represented by the Minister of Industry, through the Communications Research Centre Canada, Ottawa, Ontario (CA)

( * ) Notice: Subject to any disclaimer, the term of this patent is extended or adjusted under 35 U.S.C. 154(b) by 536 days.

(21) Appl. No.: 10/765,138

(22) Filed: Jan. 28, 2004

(65) Prior Publication Data
US 2004/0187162 A1    Sep. 23, 2004

Related U.S. Application Data (60) Provisional application No. 60/443,550, filed on Jan. 30, 2003.

(51) Int. Cl.
*H04N 5/38* (2006.01)
*H04L 27/00* (2006.01)
*H04Q 7/20* (2006.01)
*H04B 7/185* (2006.01)

(52) U.S. Cl. .................. 348/723; 348/614; 455/456.1; 342/357.06; 375/295

(58) Field of Classification Search ............. 348/614, 348/723, 473; 455/456.1, 456.5, 456.6, 63.1, 455/65, 63.4; 375/295, 346, 240.28; 342/357.01, 342/357.06, 357.12, 450, 463
See application file for complete search history.

(56) References Cited

U.S. PATENT DOCUMENTS

| | | | |
|---|---|---|---|
| 5,949,796 A * | 9/1999 | Kumar | 370/529 |
| 5,956,373 A * | 9/1999 | Goldston et al. | 375/298 |
| 5,960,048 A * | 9/1999 | Haartsen | 375/366 |
| 6,075,823 A | 6/2000 | Sonoda | 375/267 |
| 6,122,015 A | 9/2000 | Al-Dhahir et al. | 348/614 |
| 6,128,337 A | 10/2000 | Schipper et al. | 375/229 |
| 6,304,299 B1 | 10/2001 | Frey et al. | 348/614 |
| 6,393,294 B1 * | 5/2002 | Perez-Breva et al. | 455/456.5 |
| 6,417,805 B1 | 7/2002 | Hershey et al. | 342/453 |
| 6,437,832 B1 | 8/2002 | Grabb et al. | 348/614 |
| 6,501,804 B1 | 12/2002 | Rudolph et al. | 375/285 |
| 6,501,955 B1 * | 12/2002 | Durrant et al. | 455/456.1 |
| 6,727,847 B2 * | 4/2004 | Rabinowitz et al. | 342/357.06 |
| 6,952,182 B2 * | 10/2005 | Spilker et al. | 342/464 |
| 7,042,949 B1 * | 5/2006 | Omura et al. | 375/240.28 |
| 2003/0021414 A1 * | 1/2003 | Nash-Putnam | 380/252 |
| 2004/0080454 A1 * | 4/2004 | Camp | 342/464 |

* cited by examiner

*Primary Examiner*—Victor R. Kostak
(74) *Attorney, Agent, or Firm*—Teitelbaum & MacLean; Neil Teitelbaum; Doug MacLean (57) ABSTRACT

The invention relates to a transmitter identification system, which utilizes an identification signal embedded into a digital television signal, enabling the transmitter of origin to be identified at a receiving station. Ideally the identification signal is an orthogonal pseudo-random sequence time synchronized to the signal frame structure of the digital television signal. Particularly designed for single frequency networks, identification of the various transmitted signals enables the network to be tuned to eliminate or minimize multi-path effects at certain locations, which receive transmissions from various transmitters.

24 Claims, 7 Drawing Sheets

Figure 6.
(a) No averaging, (b) 60 times averaging.

Figure 8. Improving the transmitter identification through post-processing.

Figure 7. Shape of the impulse due to the limited bandwidth.

under the invention claim priority from U.S. Patent Application No. 60/443,550 filed Jan. 30, 2003.

DIGITAL TELEVISION TRANSMITTER IDENTIFICATION SYSTEM USING PSEUDO-RANDOM SEQUENCES

CROSS-REFERENCE TO RELATED APPLICATIONS

The present application claims priority from U.S. Patent Application No. 60/443,550 filed Jan. 30, 2003.

TECHNICAL FIELD

The present invention relates to a transmitter identification system, and in particular to a digital television (DTV) transmitter identification system for identifying the origin of a received DTV signal, which can be used for tuning a distributed-transmission (single-frequency) DTV network, geographic locating, estimating the channel impulse response for a particular transmitter with a very long delay spread capacity, and transmitting robust low bit rate control information to mobile and stationary terminals.

BACKGROUND OF THE INVENTION

Figure 1:
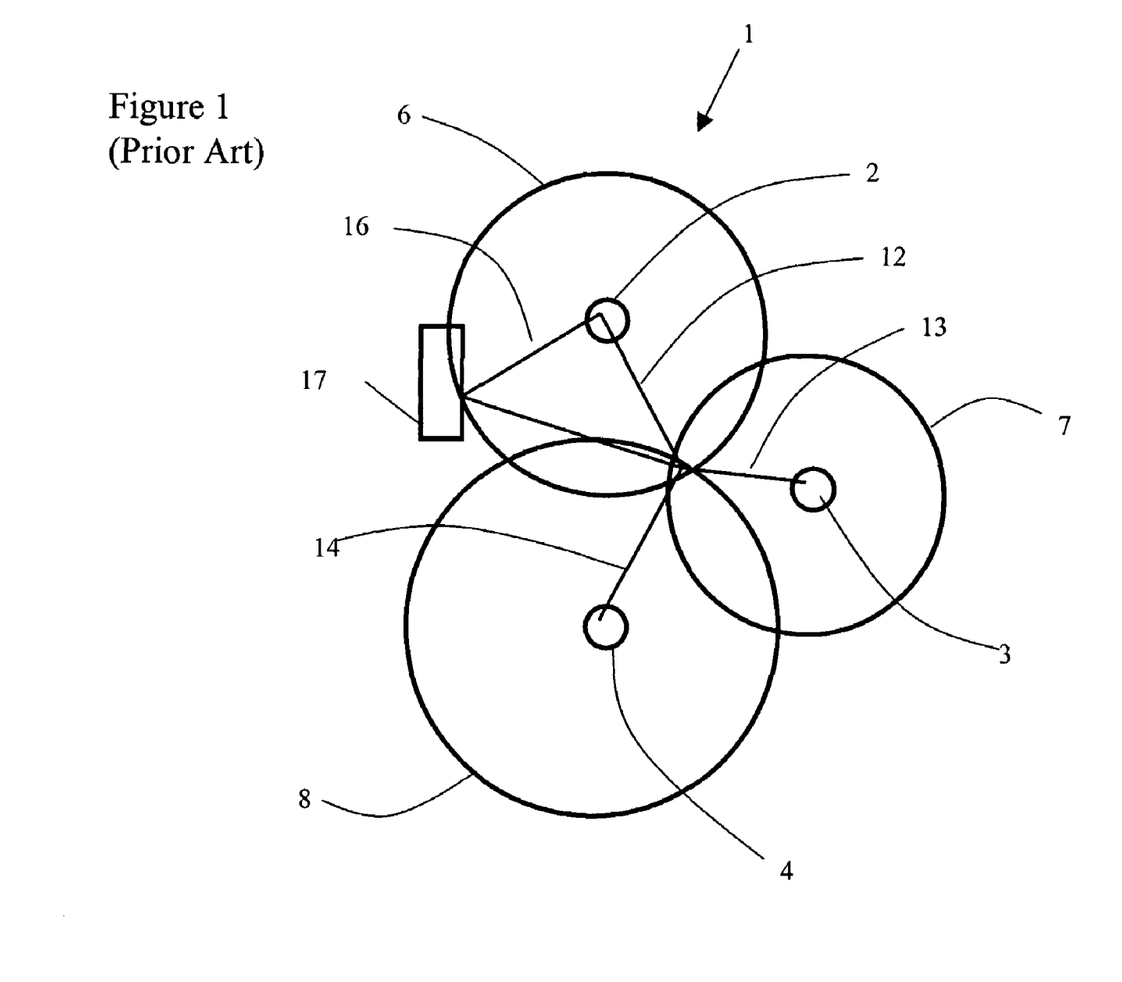
FIG. 1 is a schematic illustration of a conventional Digital Television Network.

Digital television (DTV) networks are comprised of a plurality of transmitters, each broadcasting the same signal using multiple frequencies or a single frequency (single frequency network). As the number of transmitters grows, there is an increased desire to be able to identify the transmitter of origin for each signal received. Transmitter identification will enable broadcasting authorities to identify illegal or improperly operating transmitters. Moreover, transmitter identification can also be used to tune various transmitters in a single frequency network to minimize the effects of multi-path interference. Multi-path interference is caused by the destructive interference of several different transmissions originating from different transmitters and/or caused by the reflection of transmissions. FIG. 1 illustrates a single-frequency digital-television network 1, including three transmitters 2, 3 and 4 with transmission ranges 6, 7 and 8, respectively. With reference to the overlap area, designated by reference numeral 9, a receiver positioned therein would receive a transmitted signal comprised of direct transmitted signals 12, 13 and 14 from transmitters 2, 3 and 4, respectively, plus reflected transmitted signal 16 from transmitter 2. The reflected transmitted signal 16 resulting from a reflection off of a large obstacle 17, e.g. a large building. Unfortunately, the various components of the transmitted signal may not all be in phase, resulting in undesired effects. The effects of multi-path interference to DTV signals include a degradation in the television picture and sound. In analog television, multi-path interference causes "ghost" images.

U.S. Pat. No. 6,075,823 issued Jun. 13, 2000 to Hideaki Sonoda; U.S. Pat. No. 6,122,015 issued Sep. 19, 2000 to Al-Dhahir et al; U.S. Pat. No. 6,128,337 issued Oct. 3, 2000 to Schipper et al; U.S. Pat. No. 6,304,299 issued Oct. 16, 2001 to Frey et al; U.S. Pat. No. 6,437,832 issued Aug. 20, 2002 to Grabb et al; and U.S. Pat. No. 6,501,804 issued Dec. 31, 2000 issued to Rudolph et al disclose various solutions to overcoming the problem of multi-path interference. In general, the systems disclosed in the aforementioned references compare a transmitted test signal including noise with a reference signal, and construct a filter in accordance with the results of the comparison to remove noise from transmitted digital television signals. Unfortunately, none of the prior art references provide an identification signal for each transmitter, nor do they provide a system for tuning the entire network. Each of the aforementioned systems requires a complicated filtering circuit to be installed in every receiver in the system, which greatly increase the cost to the operator, and therefore the consumer.

An object of the present invention is to overcome the shortcomings of the prior art by providing a transmitter identification system that can be used to identify the transmissions, direct or redirected, from various transmitters.

Another object of the present invention is to provide timing information relating to the transmissions from known transmitters, which can be used to tune the transmitters in a network to minimize the effects of multi-path interference.

SUMMARY OF THE INVENTION

Accordingly, the present invention relates to a method of identifying a transmitter in a distributed digital television transmission network, including a plurality of transmitters and a plurality of receivers, comprising the steps of:
a) providing a signal to be transmitted to each transmitter;
b) embedding an identification sequence into the signal, indicative of the transmitter of origin, forming a combined transmission; and
c) transmitting the combined transmission from each transmitter.

BRIEF DESCRIPTION OF THE DRAWINGS

The invention will be described in greater detail with reference to the accompanying drawings which represent preferred embodiments thereof, wherein.

DETAILED DESCRIPTION

In accordance with the present invention, the transmitter identification system embeds an identification sequence in the form of a pseudo-random sequence $x_i(n)$, selected from a set of orthogonal sequences, in band into each DTV signal $d_i(n)$ creating a combined transmission $d_i'(n)$. In practice, the sequences will be truncated and, therefore, not be perfectly orthogonal; however, for the purposes of the invention they will only need to have negligible cross correlation. Accordingly, orthogonal, substantially-orthogonal and having negligible cross correlation will be used interchangeably so as not to limit the scope of protection to perfectly orthogonal.

The process is represented by the equation:

$$d_i'(n) = d_i(n) + \rho x_i(n) \qquad (1)$$

wherein $\rho$ represents a gain coefficient controlling the embedding level of the identification sequence, which varies from transmitter to transmitter depending on the modulation and channel coding schemes of the individual transmitters. After passing through a transmission channel $h_i$, a transmitted signal $r_i$ from the $i^{th}$ transmitter can be formulated as:

$$r_i(n) = d_i'(n) \otimes h_i + n_i(n) \quad (2)$$

where $n_i(n)$ is the noise for the i-th transmitter.

The overall transmitted signal $r(n)$ can be formulated as:

$$r(n) = \sum_{i=1}^{M} [d_i'(n) \otimes h_i + n_i(n)] \quad (3)$$

Figure 5:
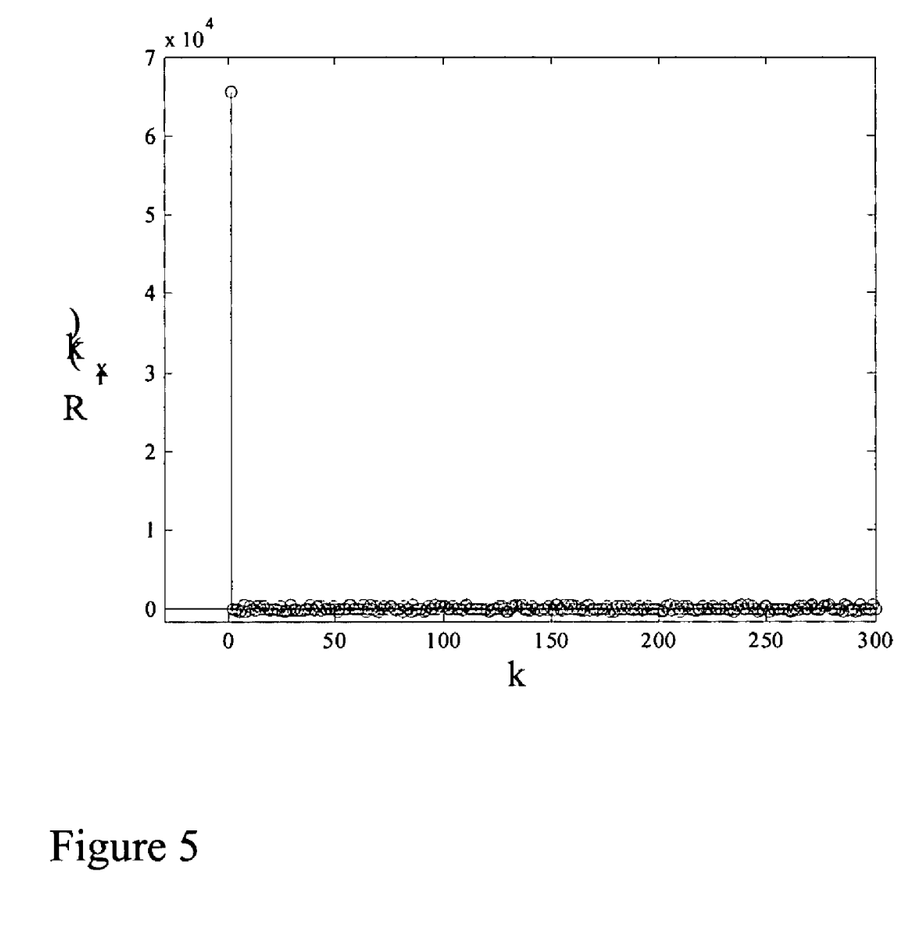
FIG. 5 illustrates an auto-correlation function of a 16-bit Kasami sequence.

Identification of a particular transmitter is impossible without additional identification processes. According to the present invention, details of the existence of a specific transmitter and the strength of each transmitted signal $r_i(n)$ at the reception site can be determined by calculating correlating functions. For example, the correlation between $r(n)$ and a locally generated identification signal $x_j(n)$ can provide identifying information, i.e. existence and strength of the signal, about the j-th transmitter. If a signal from the j-th transmitter is present, i.e. the transmitted signal $r(n)$ contains the identification sequence $x_j(n)$ matching the locally generated sequence $x_j(n)$, an impulse will appear in the cross correlation function (see FIG. 5). If more than one impulse is found for a given sequence, the impulse separations are indicative of a multi-path delay. Accordingly, this method can be used in obtaining the impulse response from each particular transmitter.

For a single frequency network, in which each transmitter transmits at the same frequency, the signal from each transmitter can be independently tuned, e.g. for power level and relative time delay between transmitters, so that the effects of multi-path interference are minimized in overlap areas, see area 9 in FIG. 1. At a given test station inside the overlap area, the cross-correlation functions for the various transmitters are compared, and the relative power levels of the signals from each transmitter are determined. From this information, it is possible to minimize multi-path effects by either delaying the transmission from one or more of the transmitters relative to one or more of the others, thereby maximizing the number of the signals that are received synchronously, or by adjusting the power level of one or more transmitter signals to lesson or increase their effect on the overall transmitted signal. The tuning will have minimal or no effect on the reception at various locations outside the overlap areas, but can greatly improve the reception at locations inside the overlap areas. Preferably, the comparisons are carried out at a plurality of test stations within the overlap area, and the transmitters are tuned in such a manner as to optimize the reception throughout the overlap area.

The cross correlation between $r(n)$ and $x_j(n)$ is defined by $$R_{rx_j}(m) = \sum_{n=0}^{N-1} r(n) x_j(n-m) \quad (4)$$

$$= \sum_{n=0}^{N-1} \left\{ \sum_{i=1}^{M} d_i'(n) \otimes h_i + n_i(n) \right\} x_j(n-m)$$

$$= \sum_{n=0}^{N-1} \left\{ \sum_{i=1}^{M} [(d_i(n) + \rho x_i(n)) \otimes h_i + n_i(n)] \right\} x_j(n-m)$$

-continued $$= \rho R_{x_j x_j} \otimes h_j + \sum_{i=1, i \neq j}^{M} \rho R_{x_i x_j} \otimes h_i +$$

$$\sum_{n=0}^{N-1} \sum_{i=1}^{M} [d_i(n) + n_i(n)] x_j(n-m)$$

With the orthogonal property of the selected sequence, the autocorrelation function $R_{x_j x_j}$ of the locally generated identification sequence $x_j$ can be approximated as a delta function. The second and third terms in the above equation (4) are only noise like sequences from the in-band DTV signals of the same transmitter and other transmitters. Therefore, the received channel response $h_j$ from the j-th transmitter can be approximated by $R_{rx_j}$, i.e.

$$R_{rx_j}(m) = Ah_j + \text{noise} \quad (5)$$

where A is a constant determined by $R_{x_j x_j}$ and the gain coefficient $\rho$. The received channel response $h_j$ from the j-th transmitter can be determined as $R_{x_j x_j}$ and $\rho$ are known.

Figure 2:
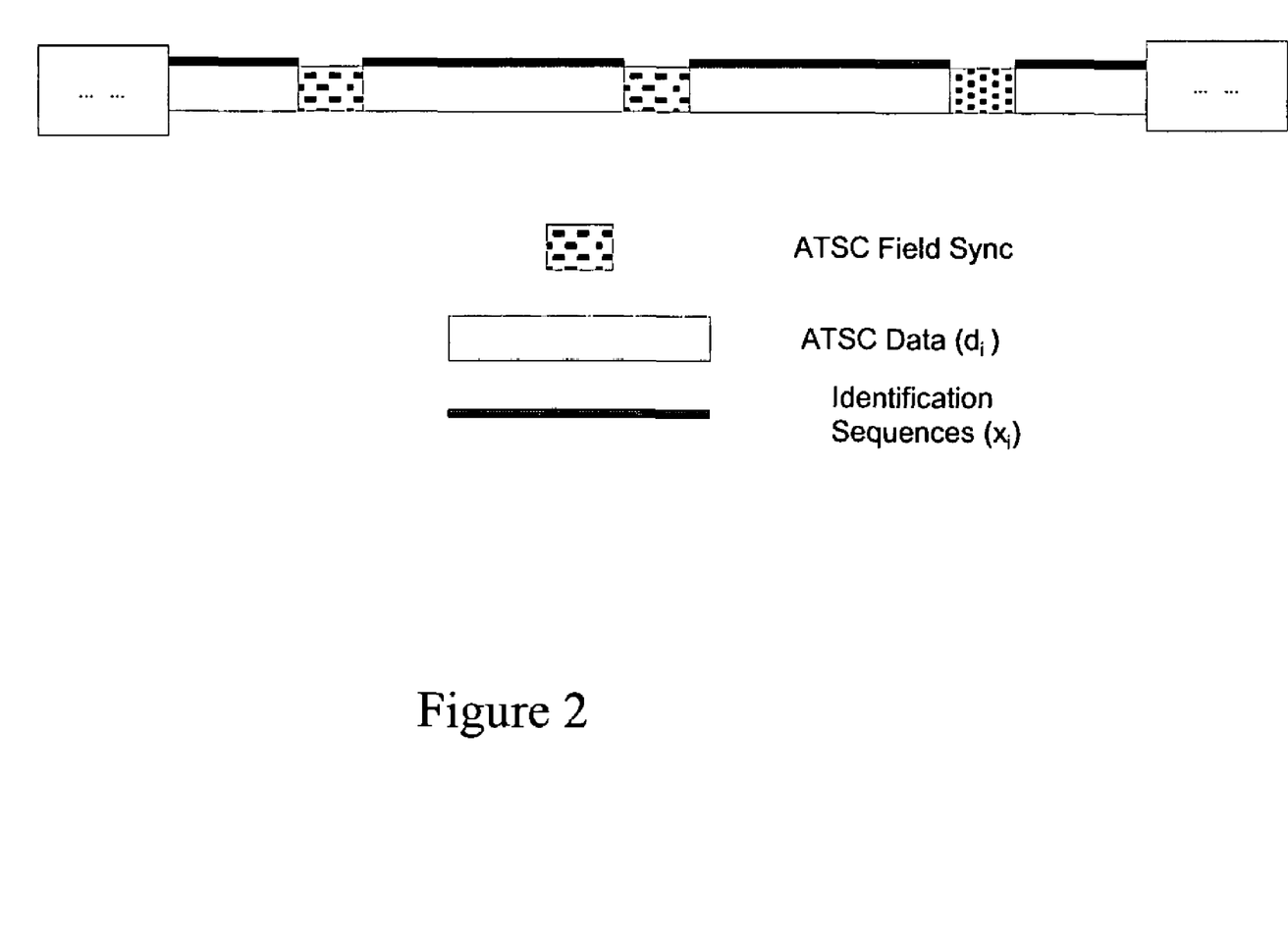
FIG. 2 illustrates a DTV signal frame structure including an identification sequence $x_i$ synchronized therein.

With reference to FIG. 2, the identification sequence $x_i$ is time synchronized to the DTV signal frame structure. The illustrated signal relates specifically to an Advanced Television Systems Committee (ATSC) DTV system, but the invention is applicable to any similar system, e.g. Digital Video Broadcasting-Terrestrial (DVB-T) or Integrated Services Digital Broadcasting-Terrestrial (ISDB-T) systems.

Different injection levels of the embedded identification sequence $x_i$ are determined for ATSC, DVB-T and ISDB systems, respectively. For ATSC systems, Kasami sequences are buried between 10 dB to 30 dB below the DTV system noise threshold, which causes negligible impact to DTV signal reception.

Figure 3:
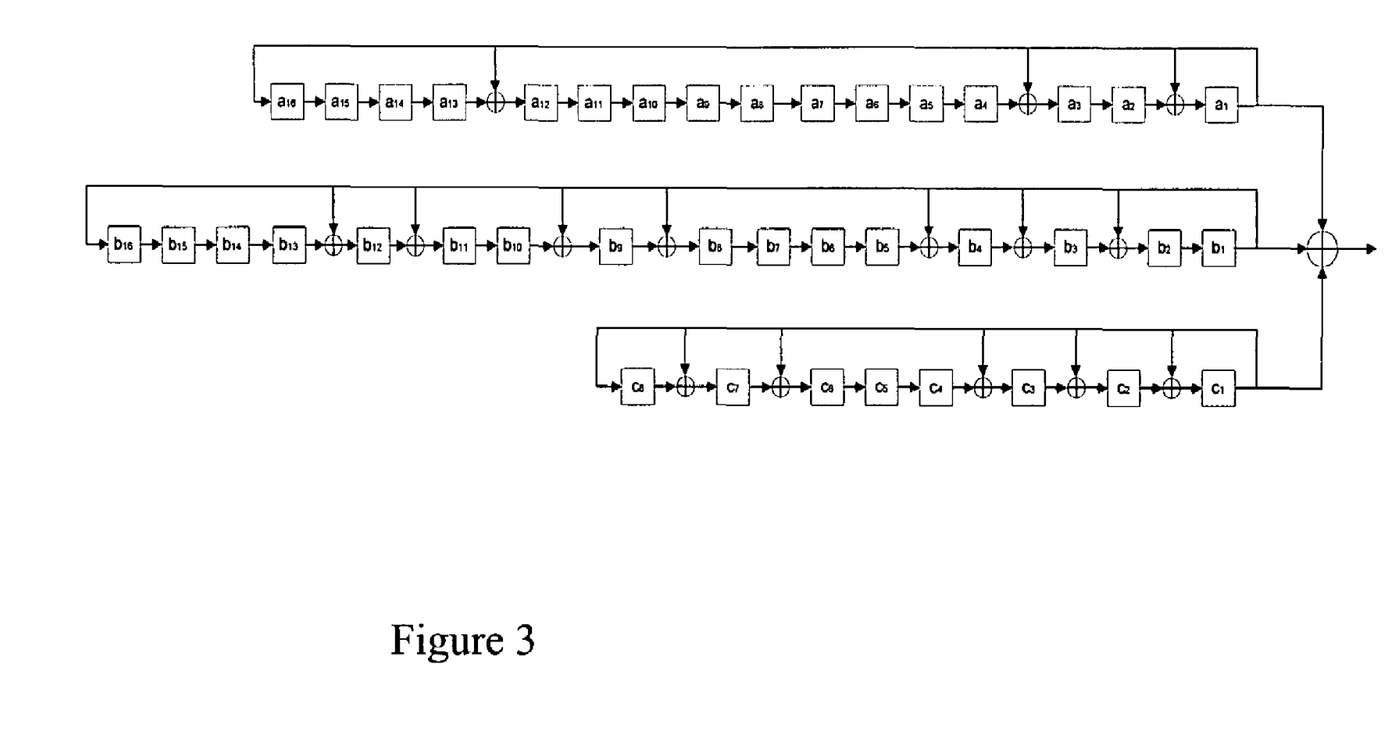
FIG. 3 illustrates a 16-bit Kasami sequence generator.
Figure 4:
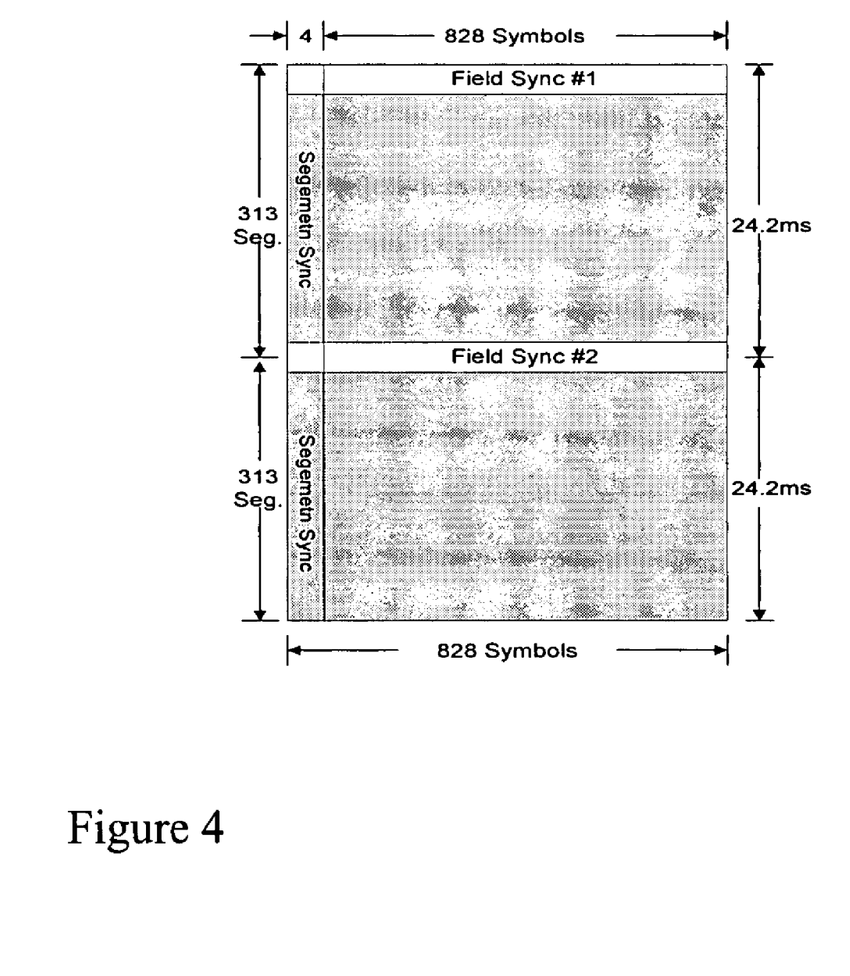
FIG. 4 illustrates a ATSC signal data field.

Preferably, 16-bit Kasami sequences are used as identification sequences for a North American ATSC DTV system. However, Gold sequences and any other suitable substantially-orthogonal pseudo-random sequences may be used. The use of 16-bit Kasami sequence is a compromise of the sequence length, spreading gain and the number of the sequences, which are available for DTV transmitter identification. FIG. 3 illustrates a 16-bit Kasami sequence generator, in which there are 16+8=24 digits or $2^{24}-1$ different initial states, which results in $2^{24}-1$ different Kasami sequences. With reference to FIG. 4, each ATSC signal data field has 312×832=259,584 symbols (including segment synchronization), therefore, three complete 16-bit Kasami sequences ($2^{16}-1=65535$ chips) and one truncated 16-bit Kasami sequence ($2^{16}-1-2519=63016$ chips) can be fitted into one ATSC field. The Kasami sequence chip rate should be the same as the ATSC DTV system symbol rate, i.e. 10.7622378 Msps. The Kasami sequences are injected during the transmission of the DTV data segments, but not during the ATSC DTV field synchronization transmission period to avoid interference with DTV signal acquisition.

The transmitter identification process can be further reduced, if the initial values for the sequence generators only differ in the last few bits for the neighboring transmitters. By assigning different Kasami sequences this way, a blind search approach can be avoided during the transmitter identification process.

Since the 16-bit Kasami sequence is very long and takes a long time to synchronize, it would be advantageous if a smaller portion of the DTV signal could be identified as a starting point, thereby facilitating synchronization. In North America the ATSC DTV field sync. PN-511 sequence, which has high signal strength, can be used as a "short code" for quick detection and synchronization of the Kasami sequence. For DVB-T and ISDB-T systems, in Europe and Japan, the cyclic prefix of the OFDM symbol can be used. Furthermore, rather than correlate the entire Kasami sequence with the received signal, the correlation function can be calculated only between the PN-511 sequence (or the cyclic prefix of the DVB-T and ISDB-T signals) and the received signal.

To reduce the computation complexity during the transmitter identification process, only a desired portion of the correlation functions between the transmitted signal r(n) and the local identification sequence x(n) is computed. For the complete computation of the cross-correlation between the transmitted signal r(n) and the local identification sequence x(n), the following equation can be used:

$$R(m) = \sum_{n=0}^{N-1} [r(n_0 + n + m) \cdot x(n)], m = 0, 1, 2, \ldots N-1 \quad (6)$$

where $n_0$ is the starting point of the received signal for correlation computation. For transmitter identification purposes, R(m) is only needed for a length of the maximum delay spread of all the multi-path delays from all of the transmitters. In the terrestrial DTV distributed transmission case, about a 6000 DTV symbol duration or 558 μs is adequate. In fact, between 40 μs and 600 μs would suffice. This is less than 1% of the total cross-correlation function samples, which significantly reduces the computation time.

Rather than conducting the correlation computation continuously in real time, a segment of the transmitted DVB-T, ISDB-T or ATSC DTV signal r(n) can be separated therefrom, each of which contains one complete embedded sequence, for correlation computation.

Upon synchronization of the embedded and locally generated identification sequences, using a PN511 sequence for ATSC signals or a cyclic prefix for DVB-T and ISDB-T signals, the received DTV signal can be divided into segments, each with a length of a DTV field plus two times the delay spread of the channel impulse response. Each segment begins at the starting point of each DTV field minus one delay spread and ends at the stopping point of the DTV field plus one delay spread. A sliding window technique can then be used to select portions of the transmitted signal for calculating the correlation function. The length of the sliding window is identical to one DTV field. As the window slides over the signal segment, the local identification sequence $x_j(n)$ is correlated to the received signal portion, which falls into the sliding window.

Figure 6:
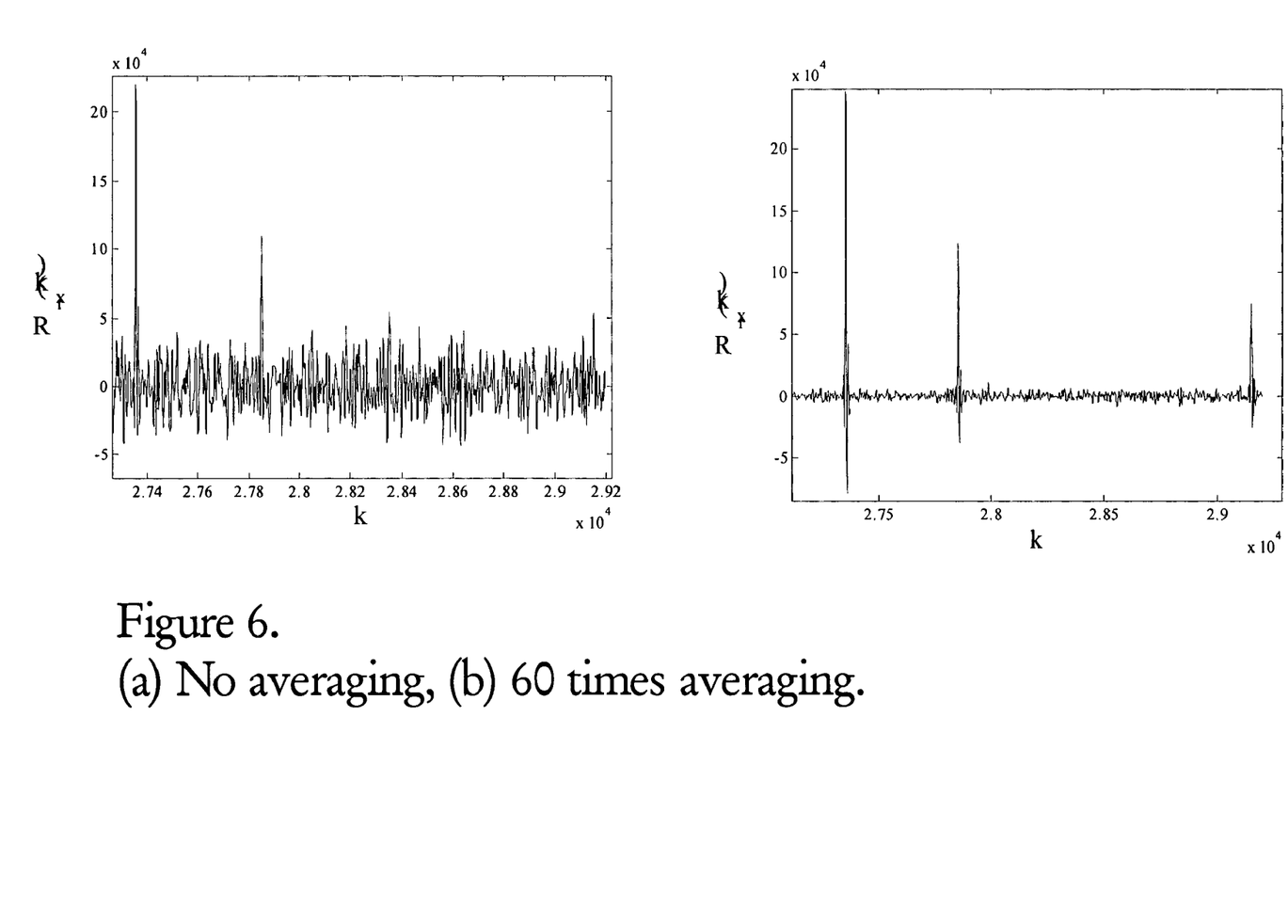
FIG. 6a illustrates a cross-correlation function over a single segment.
FIG. 6b illustrates a cross-correlation function averaged over 60 segments.

Time-domain a averaging is a technique used to reduce the in-band ATSC DTV signal interference. Post processing using ensample averaging over several cross-correlation functions can improve the dynamic range of the cross-correlation function, as in FIGS. 6a and 6b. Several segments are correlated and an average is taken to cancel out noise distinctive of each segment and to improve resolution. Averaging improves the capability of the detection of co-channel interference and the dynamic range of the impulse response. To reduce the synchronization error effect and to optimize the superimposition of the correlation functions, prior to averaging, the peaks in each correlation function are aligned in amplitude and phase.

Figure 7:
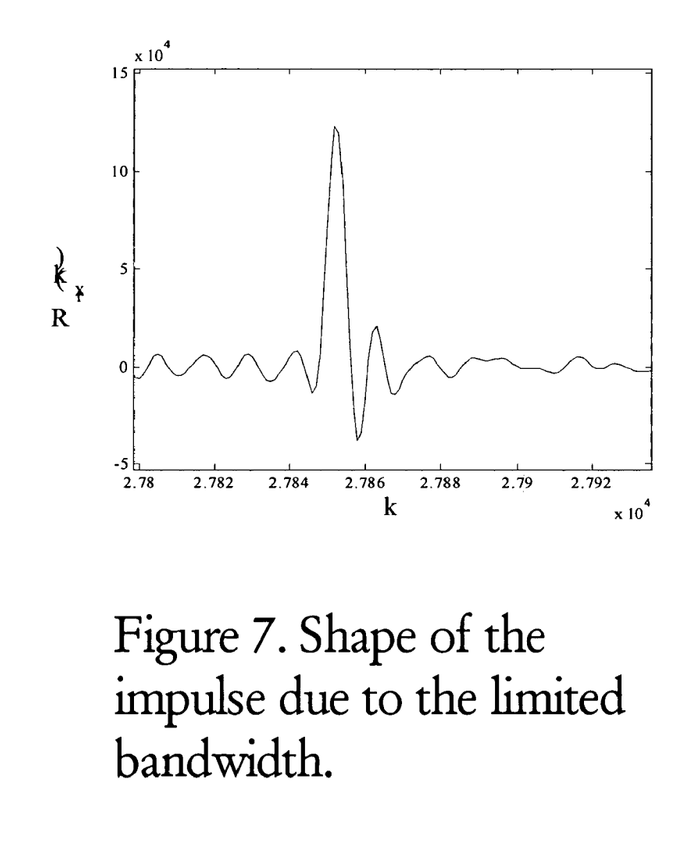
FIG. 7 illustrates an impulse in a cross-correlation function.
Figure 8:
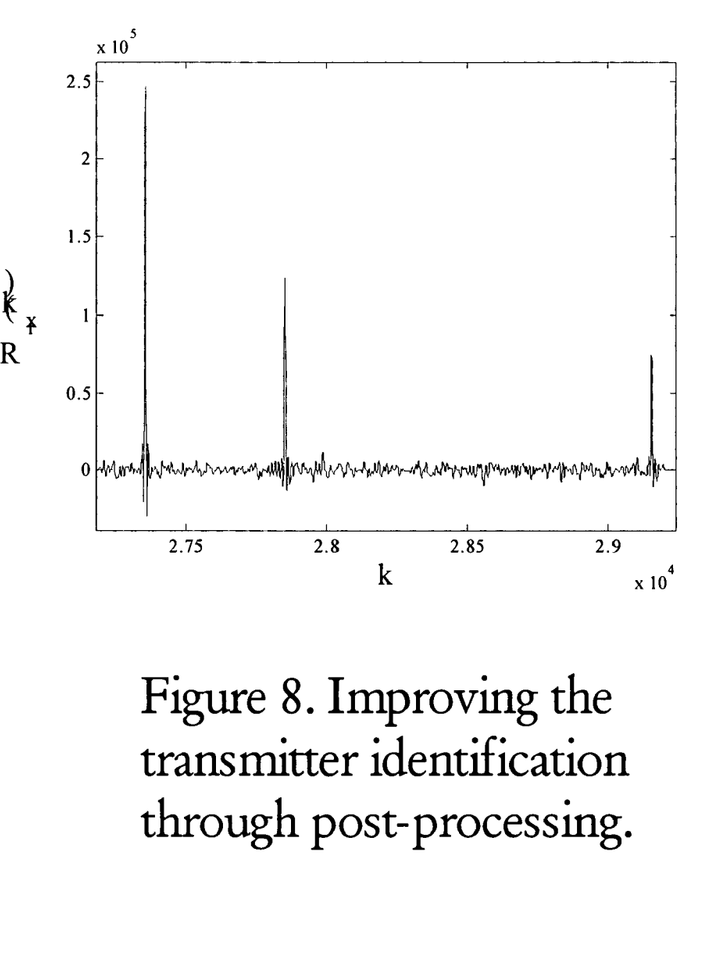
FIG. 8 illustrates an impulse in the cross-correlation function after side-lobe filtering.

With reference to FIG. 7, due to a 6/7/8 MHz DTV bandwidth limit, each impulse in the cross-correlation function is in the form of a sin(x)/x function rather than a delta function. A first sidelobe, about 17 dB below the main lobe, could be misidentified as a multi-path reflection, especially when close-in echoes exist. Post processing, or filtering using an appropriate filter response, over the cross-correlation function can reduce the side lobe of the sin(x)/x function to a negligible level, see FIG. 8. One possible way to resolve the band-limitation problem is to eliminate the shape of the non-ideal auto-correlation function from the preliminary channel estimation results. To simplify the notations, the correlation result is written as:

$$R'=Ah+\text{noise} \quad (7)$$

Where h is the ideal impulse response to be estimated and R' is the correlation function with a truncated length L'.

$$R'=[R(1), R(2), \ldots R(L')]^T \quad (8)$$

Where A is determined from the side lobe matrix $$A = \begin{bmatrix} R_{ww}(L), & R_{ww}(L-1), & \ldots & R_{ww}(1) \\ R_{ww}(L+1), & R_{ww}(L), & \ldots & R_{ww}(2) \\ R_{ww}(L+2), & R_{ww}(L+1), & \ldots & R_{ww}(3) \\ \vdots & \vdots & & \vdots \\ R_{ww}(L+L'-1), & R_{ww}(L+L'-2), & \ldots & R_{ww}(L) \end{bmatrix}$$

when noise is Gaussian noise, h can be resolved using:

$$h=(A^H A)^{-1} A^H R' \quad (9)$$

By inverting the amplitude of the embedded Kasami sequence, one-bit information can be transmitted per Kasami sequence or several Kasami sequences can be used to represent one bit, depending on the injection level of the Kasami sequence. At the receiver, a positive correlation would indicate a '1' and a negative correlation would indicate a '0'. This technique can be used to transmit low speed data over the entire DTV coverage area to provide data service or for cue and control.

DVB-T and ISDB-T DTV system transmitters can also can be identified using a 12-bit Kasami sequence. The Kasami sequence should be locked to the FFT block for fast synchronization.

In a distributed transmission environment, if a receiving site can identify more than three transmitters, and the transmitter geographical locations as well as their DTV transmission time delays are known, the receiving location can be calculated from the differences in arrival time of the Kasami sequences. Assuming the receiver already knows the relative position of the various transmitters, as the receiver identifies the transmitter of origin of a given signal, the receiver software will be able to calculate the relative time delay between the various received signals, i.e. direct combined transmissions $d_t'(n)$. From this information the receiver processor can calculate the position of the receiver relative to the transmitters.

We claim:

1. A method of identifying a transmitter in a distributed digital television transmission network, including a plurality of transmitters and a plurality of receivers, comprising the steps of:
   a) providing a signal to be transmitted to each transmitter;
   b) embedding an identification sequence into the signal, indicative of the transmitter of origin, forming a combined transmission;

c) transmitting the combined transmission from each transmitter d) receiving a transmitted signal, including direct combined transmissions from each transmitter, reflected combined transmissions from each transmitter, and noise, at a reception site; and e) determining the transmitter of origin for at least one of the direct and reflected combined transmissions from the transmitted signals.

2. The method according to claim 1, wherein the distributed digital television transmission network is a single frequency network; wherein step a) includes providing a signal to be transmitted at the same frequency to each transmitter; and wherein step e) further comprises determining the transmitter power level, and transmission time delay for each of the direct and reflected combined transmissions from the transmitted signal; and the method further comprising:

f) tuning at least one of signal power level and relative time delay of at least one transmitter in accordance with results of step e) to minimize multi-path effects in intended coverage areas of the network.

3. The method according to claim 2, further comprising repeating steps d) and e) at various locations within the network, wherein step f) is optimized for the various locations within the network.

4. The method according to claim 1, wherein the signal is a digital television signal.

5. The method according to claim 4, wherein step b) includes embedding the identification sequence in-band with the signal.

6. The method according to claim 5, wherein the identification sequence is embedded at least 10 dB below a noise threshold of the transmitted signal.

7. The method according to claim 4, wherein the identification sequence is time synchronized to the signal frame structure of the digital television (DTV) signal.

8. The method according to claim 1, wherein the identification sequences are substantially-orthogonal pseudo-random sequences.

9. The method according to claim 8, wherein step e) includes correlating the transmitted signal and a locally generated identification sequence, substantially identical to the identification sequence from one of the transmitters, to obtain a cross-correlation function, whereby when the locally generated identification sequence is identical to the identification sequence from the one transmitter, the cross-correlation function includes an impulse.

10. The method according to claim 9, wherein step e) further comprises obtaining an impulse response for one of the transmitters from the cross-correlation function.

11. The method according to claim 9, wherein step b) includes embedding a Kasami sequence as the identification sequence using a Kasami sequence generator.

12. The method according to claim 11, wherein initial values of the sequence generators are similar for adjacent transmitters, thereby facilitating the determination of the transmitter of origin.

13. The method according to claim 11, wherein step e) includes using one of: an Advanced Television Systems Committee (ATSC) DTV field synchronization PN-511 sequence, a cyclic prefix from a Digital Video Broadcasting-Terrestrial (DVB-T), and a cyclic prefix from an Integrated Services Digital Broadcasting-Terrestrial (ISDB-T) signal for detection of the Kasami sequence and for synchronization of the Kasami sequence with the identification sequence.

14. The method according to claim 13, wherein step e) further comprises correlating only a segment of the transmitted signal and the identification sequence from each transmitter.

15. The method according to claim 14, wherein step e) includes a sliding window technique to select the transmitted signal for correlating with the locally generated identification sequence.

16. The method according to claim 15, wherein the segment of the transmitted signal has a length substantially equal to a length of a DTV field plus twice a length of a delay spread of a channel impulse, whereby each segment substantially begins at a starting point of each DTV field minus one delay spread and ends at a end point of the DTV field plus one delay spread; and wherein a length of a sliding window is substantially equal to the length of one DTV field.

17. The method according to claim 16, wherein the cross-correlation function between the segment of the transmitted signal and the identification sequence is between 40 µs and 600 µs in duration.

18. The method according to claim 14, wherein step e) includes correlating over a plurality of segments to obtain a plurality of cross-correlation functions, and averaging the plurality of cross correlation functions to cancel out noise and improve resolution.

19. The method according to claim 18, wherein step e) includes aligning corresponding peaks in each cross-correlation function before averaging.

20. The method according to claim 19, wherein step e) further comprises filtering side lobes from impulses in the cross-correlation functions.

21. The method according to claim 1, further comprising:

repeating step e) to determine cross-correlation functions with impulses indicative of direct combined transmissions from at least three transmitters;

determining differential time delays between the direct combined transmissions from the at least three transmitters; and determining geographic location of reception site based on known geographic locations of the at least three transmitters.

22. The method according to claim 21, wherein the identification sequences are substantially-orthogonal pseudo-random sequences with negligible cross-correlation.

23. The method according to claim 22, wherein the identification sequences are selected from the group consisting of Kasami sequences and Gold sequences.

24. The method according to claim 11, further comprising inverting the amplitude of the Kasami sequence for transmitting one bit of information per one or more Kasami sequences, whereby data is transmitted to provide information to the receiver.

* * * * *